Dec. 29, 1959  L. A. M. PHELAN ET AL  2,918,861
EQUALIZER FOR PRESSURE COOKERS
Filed Dec. 26, 1957
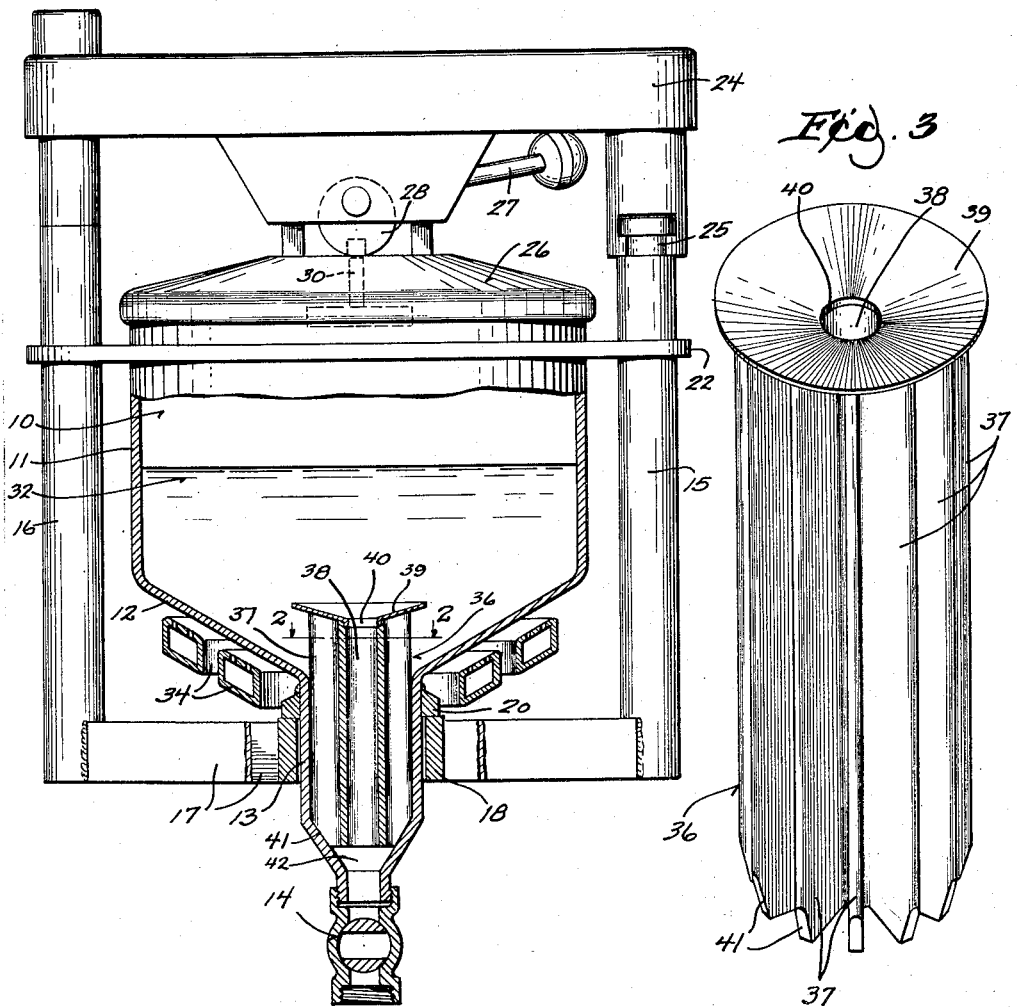
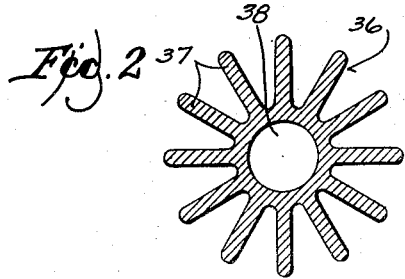
INVENTORS
LOUIS A. M. PHELAN
HAROLD V. KELTON
BY
James E. Nilles
ATTORNEY 2,918,861
EQUALIZER FOR PRESSURE COOKERS Louis A. M. Phelan, Roscoe, Ill., and Harold V. Kelton, Beloit, Wis.; said Harold V. Kelton assignor to Louis A. M. Phelan Application December 26, 1957, Serial No. 705,173

7 Claims. (Cl. 99—408)

This invention pertains generally to pressure cookers of the type in which pieces of food are immersed in a very hot non-aqueous and non-toxic cooking fat, the cooking vessel then sealed and super atmospheric pressure built up within the vessel. The food, such as large pieces of chicken, is browned and cooked in a matter of a few minutes. The pressure in the vessel is then released, the vessel opened and the food removed from the hot, bubbling cooking fat.

To quickly build up pressure within the vessel, water may be injected therein above the hot fat, and this water immediately turns to steam. The food itself also has a considerable amount of water in it.

The temperature of the cooking fat is well above 300 degrees Fahrenheit, a temperature of 375 degrees not being uncommon. In cookers of this type a considerable amount of water collects at the bottom of the cooker over a period of time, for example, as much as a pint of water will collect below the hot fat over a period of two hours. The temperature of this lowermost portion of the cooking vessel is ordinarily well below the 212 degree boiling point of water although the temperature of the fat above it is considerably more, as previously mentioned.

A sediment chamber or sump is provided at the bottom of the vessel which serves to collect crumbs and particles of food and thereby keeps the fat clean. By so cleaning the fat, the latter has longer life and furthermore, the crumbs will not burn as they otherwise would if left in the fat. It is in this chamber or "sump" that the water collects.

A stray current of hot fat occasionally goes down and picks up some of the water, bringing the water up into the body of hot fat which results in an "eruption." The water turns to steam immediately upon reaching the hot fat and the resulting turbulence in the hot fat throws a considerable portion of it out of the pot, when the latter is open.

These stray fat currents or other "surging" of the fat may be caused in several ways, for example, by the operator dropping the metal basket of food too quickly into the hot fat or simply by taking the pressure off of the pot. In general, the action of the bubbling fat may be sufficient to cause water to be picked up by the hot fat above it.

In accordance with the present invention, means has been provided for preventing accumulation of water in the lowermost part of the cooking vessel under normal conditions of operation. If, however, due to abnormal conditions, some water does accumulate in the sediment chamber or sump, the means provided by the invention prevents this water from being picked up and carried into the hot fat zone. In other words, the invention provides a means for gradually boiling this water off in an orderly manner, instead of permitting a stray current of fat to pick up the water and mixing it suddenly with the body of hot fat.

The present invention provides a heat conducting means that extends into the sump and prevents water from accumulating in the sump under normal conditions. The device is such that if water does happen to accumulate, it is prevented from being picked up by the hot fat and, instead, is gradually boiled off as steam which then passes harmlessly through the body of hot fat.

The heat conducting means also provides for cleaning the valve at the bottom of the cooker of crumbs which accumulate in the sump.

These and other objects of the invention will appear hereinafter as this disclosure progresses, reference being had to the accompanying drawings in which:

Figure 1 is an elevational view, partially in section, of a pressure cooker embodying this invention;

Figure 2 is a sectional view taken on line 2—2 of Figure 1; and

Figure 3 is a perspective view of the equalizer.

Referring more particularly to the drawings, the cooking vessel 10 has a main cylindrical portion 11 from which the tapered portion 12 converges downwardly. Portion 12 has a smaller cylindrical portion 13 which terminates in communication with a clean out valve 14 at its lower end.

The vessel 10 is mounted in the frame of the cooker which comprises side columns 15 and 16 rigidly connected together at their lower ends by the spaced cross braces 17 welded thereto. A mounting ring 18 is welded between cross braces 17 and in which is mounted the cylindrical portion 13 of the vessel. A support ring 20 is welded to the portion 13 and rests on the ring to support the vessel.

A support ring 22 is tightly fitted around the vessel, and columns 15, 16 extend through the ring 22 to accurately locate the upper ends of the columns relative to one another and to the vessel.

A horizontally swingable yoke 24 is pivotally mounted on column 16 and is detachably connected to the other column by the slot and T connection 25. The yoke carries with it the cover 26 which is mounted thereon for positive vertical shifting in either direction to open or close the vessel. The lever 27 and its associated cam 28 effect this vertical shifting in accordance with the teachings of our co-pending U.S. application, Serial Number 605,872, filed August 23, 1956, now Patent No. 2,917,200, issued on December 15, 1959, which also fully describes the other above-mentioned structure. Reference may be had to said application if deemed necessary, but it is believed sufficient to say that the cover can seal the vessel whereby super atmospheric pressure can be built up therein to aid in quickly cooking the food. After the food is cooked, which requires only a few minutes, the pressure is released within the cooker by means which forms no part of the present invention, but it will suffice to say that when the pressure in the vessel drops to a predetermined minimum, the safety piston 30 is urged by its spring out of contact with the cam 28 and the cover can then be raised out of the vessel by lever 27 and swung horizontally out of the way. The entire top of the vessel is then accessible and the load of food which is in a wire basket (not shown) can then be lifted by appropriate tongs (not shown) out of the hot, boiling fat 32. At this stage the fat is bubbling considerably and any spattering of the fat out of the vessel is, obviously, very undesirable.

A gas burner ring 34 is mounted beneath the vessel portion 12 and supplies the heat for raising the temperature of the fat to the cooking temperature of approximately 375° for some foods, for example, chicken.

The cylindrical portion 13 at the bottom of the vessel constitutes a sump or sediment chamber into which falls particles of food, that is, crumbs, that fall off of the food in the basket. These particles are thus collected in the sump so that they do not burn in the body of hot fat after a few cooking cycles. It is desirable to remove these particles for two reasons, first, to thereby give the fat longer cooking life before it begins to "foam up," and secondly to prevent these crumbs, which would otherwise be burned to a crisp, from being deposited on the food in the basket being cooked.

After the cover has been closed at the start of the cooking cycle, water is injected into the vessel, by means not shown, for the purpose of immediately building up the pressure in the vessel to speed the cooking process. This water immediately turns to steam and the food itself also has a considerable amount of water in it. Therefore, after a two hour period of operation, during which many cooking cycles have elapsed, a considerable amount of water, on the order of a pint, may have collected in the sump 13.

The water, because it is heavier than the cooking fat, therefore collects in the sump and the temperature of this water and the sump zone is well below the boiling point of the water, being approximately 120° F. if the fat is at 375° F.

As previously mentioned, stray currents of hot fat go down into the sump and carries some of the water therein back up into the hot fat. Upon contacting the fat, the water immediately turns to steam, resulting in a considerable turbulence of the fat in the vessel. This turbulence may splash some of the fat out of the vessel if the cover is open, and it is desirable to prevent this from happening.

In accordance with the present invention an equalizer has been provided which, under normal cooking operations, will prevent the accumulation of water in the sump and thereby eliminates this splattering of very hot fat.

The metal equalizer 36 is generally elongated and cylindrical in shape and has a series of radially extending fins 37 which are shown for illustrative purposes as being formed integrally with the central tube portion 38. The upper end of the equalizer has a dish shaped plate 39 secured thereto which has an aperture 40 aligned with the interior of the tube portion 38. The lowermost ends of the fins 37 are tapered as at 41 to permit the equalizer to fit closer to the bottom of the sump. The small pocket 42 at the bottom of the sump permits complete drainage of the fat from between the fins.

The outer edges of the fins fit closely in the interior of the sump and the equalizer extends a considerable distance up into the body of the hot fat, as shown in Figure 1.

The equalizer serves to conduct heat from the hot fat downwardly into the sump zone, thereby keeping the sump above the boiling point of water, but also maintaining it below the burning point of the crumbs. The fins of the equalizer contribute to good heat transfer and also serve another important function as will appear.

Under abnormal conditions of operation, for example, cooking food with an extremely high moisture content or when an especially large amount of water is required to be injected to raise the pressure, some water may accumulate in the sump even when using the equalizer. By means of the baffling effect of the fins on the equalizer, the currents of fat cannot pick up this water and transmit it upwardly. In other words, the fins block any movement of currents and the latter cannot flow from one area to another, particularly in a circumferential direction. The shape of the space between the fins is rather narrow in a circumferential direction and extends deeply into the body of the equalizer. As a result, the water that does accumulate is gradually boiled off in an orderly manner by the heat transmitted by the equalizer, with the steam passing harmlessly upward through the hot fat. After the water is boiled off, the temperature of the fat in the sump continues to rise until conditions reach an equilibrium at approximately 250° F.

The equalizer has a central opening along its entire length. The accumulation of crumbs in the sump can be forced through the valve 14, when the latter is open, (turned 90 degrees from the position shown) by inserting a ram rod (not shown) downwardly through the open center of the equalizer and on through the opening through the drain valve. The dish shaped plate 39 on the top of the equalizer is provided to guide the rod into the equalizer opening. The fat becomes opaque after a few hours of operation and as a result the operator cannot see the opening but must guide the rod by feel into the equalizer. With the accumulation of crumbs removed the vessel can be completely drained.

Various modes of carrying out the invention are contemplated as being within the scope of the following claims particularly pointing out and distinctly claiming the subject matter which is regarded as the invention.

We claim:

1. Food cooking apparatus comprising a vessel adapted to contain a hot cooking fat in which food to be cooked is immersed, said vessel having a sump at its lower end in which water tends to accumulate, a clean out valve at the lower end of said sump, and an equalizer in and withdrawable from said sump and extending upwardly into said vessel, said equalizer having baffle means along its length for contacting said sump and forming passages therewith in a vertical direction only, said equalizer adapted to conduct heat from said hot fat down into said sump, whereby any water collecting in said sump is boiled off via said passages.

2. Food cooking apparatus comprising a vessel adapted to contain a hot cooking fat in which food to be cooked is immersed, said vessel having a sump at its lower end in which water tends to accumulate, a clean out valve at the lower end of said sump, and an equalizer in said sump and extending upwardly into said vessel to conduct heat from said hot fat down into said sump, said equalizer including a series of circumferentially spaced fins extending generally radially therefrom along its length, whereby currents of hot fat are prevented from circulating in said sump and any water collecting in said sump is turned to steam.

3. Food cooking apparatus comprising a vessel adapted to contain a hot cooking fat in which food to be cooked is immersed, said vessel having a sump at its lower end in which water and crumbs tend to accumulate, a clean out valve at the lower end of said sump, and an equalizer terminating at its lower end in said sump and being freely slidable therein so as to be insertible in and removable from said sump through the upper end of said vessel, said equalizer extending upwardly into said vessel to conduct heat from said hot fat down into said sump, said equalizer having baffle means along its length for forming vertical passages with said sump for the passage of steam upwardly therethrough, whereby any water collecting in said sump is boiled off, said equalizer having an opening extending therethrough and in alignment with said valve.

4. Food cooking apparatus comprising a vessel adapted to contain a hot cooking fat in which food to be cooked is immersed, said vessel having a cylindrical shaped sump at its lower end in which water and crumbs tend to accumulate, a clean out valve at the lower end of said sump, and an elongated and generally cylindrical shaped equalizer in said sump and extending upwardly into said vessel to conduct heat from said hot fat down into said sump, said equalizer including a series of circumferentially spaced fins extending generally radially therefrom along its length, whereby currents of hot fat are prevented from circulating in said sump and any water collecting in said sump is turned to steam.

5. Food cooking apparatus comprising, a vessel adapted to contain a hot cooking fat in which food to be cooked is immersed, said vessel having a cylindrical shaped sump at its lower end in which water and crumbs tend to accumulate, a clean out valve at the lower end of said sump, and an elongated and generally cylindrical shaped equalizer in said sump and extending upwardly into said vessel to conduct heat from said hot fat down into said sump whereby any water collecting in said sump is boiled off, said equalizer including a series of circumferentially spaced fins extending generally radially therefrom along its length to prevent circulation of fluid in said sump, said equalizer also having an aperture extending centrally therethrough and in alignment with said valve to facilitate forcing said crumbs out through said valve.

6. As an article of manufacture, a heat conducting equalizer for cooking apparatus, said equalizer being of elongated and generally cylindrical configuration and comprising, a tubular central portion, a series of circumferentially spaced fins extending from said central portion and generally coextensive therewith in length and an upwardly facing dish shaped plate at the upper end of said tubular portion and having an aperture in alignment therewith.

7. Food cooking apparatus comprising, a vessel adapted to contain a hot cooking fat in which food to be cooked is immersed, said vessel having a sump at its lower end in which water and crumbs tend to accumulate, a clean out valve at the lower end of said sump, and an elongated equalizer in said sump and extending upwardly into said vessel to conduct heat from said hot fat down into said sump whereby any water collecting in said sump is boiled off, said equalizer including a series of spaced fins extending generally outwardly therefrom along its length to prevent circulation of fluid in said sump, said equalizer also having an aperture extending centrally therethrough and in alignment with said valve to facilitate forcing said crumbs out through said valve.

References Cited in the file of this patent

UNITED STATES PATENTS

| | | |
|---|---|---|
| 1,871,365 | Griswold | Aug. 9, 1932 |
| 2,337,481 | Lowe | Dec. 21, 1943 |
| 2,485,689 | Bauman | Oct. 25, 1949 |
| 2,545,661 | Hansson | Mar. 20, 1951 |
| 2,744,738 | Hjuliam | May 8, 1956 |

FOREIGN PATENTS

| | | |
|---|---|---|
| 382,801 | Great Britain | Nov. 3, 1932 |
| 855,181 | France | May 4, 1940 |
| 1,032,274 | France | June 30, 1953 |